Figure 1:
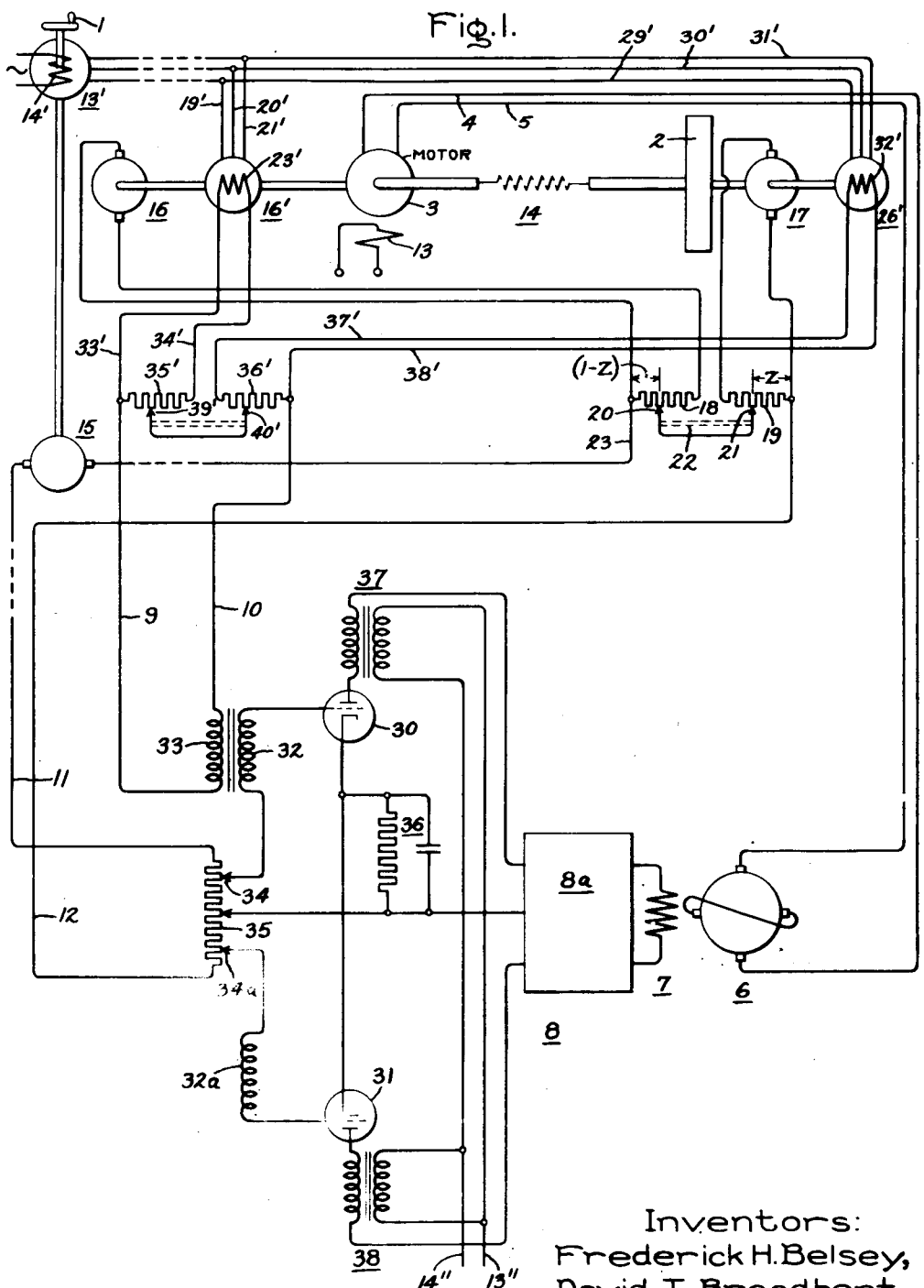

Inventors:
Frederick H. Belsey,
David T. Broadbent,
by [signature]
Their Attorney.

Patented Jan. 15, 1952

2,582,222

UNITED STATES PATENT OFFICE 2,582,222

CONTROL SYSTEM OF THE CORRESPONDENCE KIND FOR MOVABLE MEMBERS

Frederick Harold Belsey, Sale, and David Travis Broadbent, Stretford, England, assignors to General Electric Company, a corporation of New York Application December 24, 1948, Serial No. 67,232
In Great Britain June 7, 1945

7 Claims. (Cl. 318—28)

1

This invention relates to control systems of the correspondence kind, that is to say control systems for maintaining a movable member in a required position corresponding with that of a fixed or movable controlling member or object, such as in alignment with a control member. Control systems of this kind comprise means responsive to departure of the position or motion of the movable object from the required position or motion thereof, producing a control action on a motive equipment or source of power for moving the movable object, whereby to produce on the latter a torque directed to reduce said departure to zero, so as to maintain the required correspondence between the positions or motions of the movable member and the controlling member or object.

The invention moreover relates specifically to correspondence control systems of the kind in which said control action is responsive to the velocity of the movable member; such velocity control may be the primary means by which the required motion of the movable member is maintained or may be additional to a control action dependent upon displacement of the movable member from the required position thereof, the control in accordance with velocity being then employed to stabilize the system against hunting, namely self-sustained or insufficiently damped oscillation, of the movable member about the required position thereof at any time. Copending application Serial No. 65,708, having a similar title, filed December 16, 1948, in the names of the present inventors, describes arrangements of positional correspondence control systems in which the control action dependent upon the displacement and velocity of the movable member instead of being derived directly from the movement of the movable object alone, comprises two components derived respectively from the movements of the movable member and the motive equipment therefor. As described in said specification these arrangements provide advantageous operation in reducing the detrimental effects on the correspondence control of resilience and backlash which may be present in the drive from the motive equipment to the movable member.

According to the present invention, in a control system of the correspondence kind, as generally hereinbefore defined means are provided responsive to relative velocity between the motive equipment and the movable member for producing control actions dependent on the velocities of both said member and said motive equipment, and reducing the resultant effect of said control

2 actions for a given velocity of the motive equipment independently of corresponding velocity of the movable member, as a result of backlash or resilience in the drive between said equipment and said member, as compared with movement of the motive equipment and movable member at corresponding velocities to one another. The arrangement therefore provides as regards control in accordance with velocity of the movable member similar advantages in improving the stability of the control system as are provided by the system according to the aforesaid copending application.

In carrying out the invention the control system may, according to one form, comprise means responsive to the velocity of the movable member and means responsive to the velocity of the motive equipment, in combination with means adapted to produce a control quantity representative of the required velocity of the movable member; said velocity responsive means producing respective control quantities dependent on the velocities of the movable member and motive equipment are arranged to act in the same sense as one another for movements of the motive equipment in the direction corresponding to movement of the movable member. The velocity responsive means may conveniently comprise tachometer generators coupled respectively with the movable member and the motive equipment and connected, in series with a tachometer generator or other means producing a voltage dependent on the required velocity of the movable member, in the input circuit of electrical control means governing the operation of the motive equipment.

According to another form, the control system may comprise, in addition to means responsive to the velocities of the movable member or the motive equipment therefor with respect to the required velocity, further means differentially responsive to the velocities of the movable member and the motive equipment, and producing an additional component in the control quantity applied by said first means to control means for governing the operation of the motive equipment. The means differentially responsive to the relative velocities of the movable member and the motive equipment may conveniently comprise tachometer generators coupled respectively with said movable member and motive equipment and connected in circuit with one another to produce a voltage or current dependent on the difference between the speeds of said generators, electrical control means being provided for producing on the motive equipment a control action comprising two components, one dependent on said current or voltage and the other dependent on departure of velocity of the movable member or the motive equipment from the required velocity. Said means responsive to departure of the velocity of the movable object or of the motive equipment from the required value may for example comprise a tachometer generator having co-operating elements coupled respectively with the movable member or the motive equipment and with a control member with which the movable member is required to be maintained in velocity correspondence.

Preferably, in carrying out the invention, the control system includes adjustable means for varying at will the relative proportions of the control action derived from the velocities of the movable object and the motive equipment respectively.

According to another feature of the invention, the ratio between the magnitude of the component of control action derived from the velocity of the movable member to the sum of the two components dependent on the velocities of the movable member and the motive equipment is made or adjustable to a value equal or substantially equal to $$\frac{I_L}{I_L + I_M}$$

where $I_L$ is the moment of inertia of the load expressed at the motor shaft, namely the moment of inertia of the load divided by the square of the velocity ratio between the motive equipment and the load, and $I_M$ is the moment of inertia of the motive equipment. In carrying out the invention, the control system is preferably arranged so that said ratio may be readily adjustable within limits so as to provide optimum operation.

As hereinbefore indicated the system according to the invention may be of the kind in which velocity alone of the movable member is controlled or may be of the kind in which the response to the velocity of the control member is additional to control in accordance with the displacement of said member. In other words, the means responsive to velocity are additional to means responsive to misalignment of the movable member from the required position thereof, the control means for the motive equipment being jointly responsive to control actions produced by said velocity responsive means and said misalignment responsive means. In the application of the invention in systems of the latter kind the control responsive to the displacement may be arranged to depend on both the displacement of the movable member and the motive equipment to provide resetting operation in accordance with said foregoing copending application.

Two embodiments of control system according to the invention will now be described by way of example with reference to Figs. 1 and 2 respectively of the accompanying drawings, which show the arrangements diagrammatically. In these embodiments the control system is of an electrical kind, the velocity responsive means, and also misalignment responsive means being electrical devices interconnected with one another so as to produce an output voltage dependent, as will appear, on the velocities and displacements of the control member, the movable member, and the motive equipment, and it will be assumed that the motive equipment comprises an electric motor supplied with current controlled through an amplifying circuit arrangement from said output voltage. It will, however, be understood that the invention is not limited in this respect but may, with suitable modifications, be employed in conjunction with power equipments of any desired kind and with control elements of any other desired form than electrical.

Referring first to Fig. 1, the embodiment of the invention shown is applied to a control system in which the motion of a hand-wheel or other control member 1 determines the motion of a movable member 2 or load device. This movable member is driven by a motive equipment which in the example illustrated comprises a direct current electric motor 3, the armature of which is connected by conductors 4 and 5 in the output circuit of a cross-field or armature reaction generator 6, preferably of the metadyne kind. This generator has a controlling field winding 7 connected in the output circuit of an amplifying means 8 arranged to produce by means of the field winding 7 a controlling field in the generator 6 dependent as will hereinafter be described on voltages applied to a pair of conductors 9 and 10 and a pair of conductors 11 and 12 with corresponding control of the output current of the generator 6 and of the torque of the motor 3 which may be provided with a separately excited field winding 13.

Resilience or backlash, or both, present in the transmission between the motor 3 and the load 2 is indicated diagrammatically at 14.

The velocity control means according to this embodiment of the invention comprises three tachometer generators 15, 16 and 17, coupled respectively with, and producing voltages dependent on the velocities respectively of, the control member 1, the motor 3, and the movable member or load 2. The tachometer generators 16 and 17 have their output terminals connected respectively with the resistances of two potentiometers 18 and 19. The moving contacts 20 and 21 of these potentiometers are connected electrically together and may also be mechanically connected as indicated at 22 so as to move in union with one another. One end of the potentiometer resistance 18 is connected by a conductor 23 with one output terminal of the tachometer generator 15 whilst one end of the other potentiometer resistance 19 is connected with the input conductor 12 of the amplifying means 8, the other input conductor 11 of which is connected with the other output terminal of said tachometer generator 15.

The control system also includes a transmitter element 13' in the form of a selsyn device coupled with the control member 1 and interconnected electrically by conductors 29', 30' and 31' with two resetting elements comprised by further selsyn devices 16' and 26' coupled respectively with the motor and load. The rotor winding 14' of the selsyn 13' is connected with the same source of alternating current as are the input conductors 13" and 14" of the amplifier 8. The rotor windings 23' and 32' of the selsyns 16' and 26' are connected by conductors 33', 34', 37' and 38' with respective potentiometers 35' and 36', the variable voltage output terminals of which are connected in series for the two potentiometers between the conductors 9 and 10. The various parts designated in Fig. 1 by primed reference numerals correspond respectively with the several parts designated by like unprimed reference numerals in Fig. 1 of the aforesaid copending application, and these parts operate to produce between the input conductors 9 and 10 an alternating voltage the magnitude and sense of which in relation to the alternating voltage applied to the rotor winding 14' and the conductors 13 and 14 is dependent upon misalignment of the movable member 2 from the required position of correspondence with the control member 1, said voltage comprising components dependent respectively on the displacements of the movable member 2 and of the motor 3, the proportion between which components is adjustable by the movable contacts 39' and 40' of the potentiometers in a manner fully described in said copending application to which reference is hereby directed.

The amplifier 8 in Fig. 1 comprises a first stage consisting of two thermionic valves 30 and 31 the control grids of which are connected through secondary windings 32 and 32a, of an input transformer, the primary winding 33 of which is connected with the conductors 9 and 10, with tapping points 34 and 34a of a centre tapped potentiometer resistor 35, which is connected between the conductors 11 and 12, automatic grid bias being provided by usual means at 36. The anode circuits of the valves are energised from conductors 13'' and 14'' through transformers 37 and 38 with alternating voltages in opposite phase to one another. The amplifier may include one or more further stages by which the resultant excitation of the field winding 7 of the generator 6 is made to depend upon the difference between the anode currents of the two valves 30 and 31. Smoothing means will be provided in the amplifier circuits for smoothing the field current of the generator 6. Such smoothing means and further stage or stages, which may be arranged in any suitable manner as will be apparent to those skilled in the art, are indicated diagrammatically at 8a.

As hereinbefore indicated, in this embodiment of the invention there are produced at the input transformer secondary windings 32 and 32a alternating voltages which in themselves tend to maintain the movable member in alignment with the control member 1. The tachometer generators 16 and 17 produce voltages which are dependent respectively on the velocities of the motive equipment and the movable member. A proportion of each of these voltages is applied to the input circuit of the amplifier in opposition, for velocities of the motor and movable member in the same direction as the velocity of the control member, to a voltage dependent on the velocity of the control member produced by the tachometer generator 15. The proportion of the voltages derived from the tachometer generators 16 and 17 is adjustable by movement of the contacts 20 and 21 of the potentiometers 18 and 19. These potentiometers are adjusted so that when the motor and load move together without backlash or resilience therebetween then the sum of the voltages derived from the two potentiometers, namely between the conductors 23 and 12, will be equal to the voltage produced by the tachometer generator 15 for a corresponding velocity of the control member 1. The mechanical connection of the contact points 20 and 21 will provide for this adjustment of the proportions of the two voltages derived from the potentiometers. The direct current voltage produced between the conductors 11 and 12 in dependence on the velocities as just above set forth is added in the grid circuits to the alternating voltage derived from the input transformer, namely from the conductors 9 and 10, so that the difference between the anode currents of the two valves will produce a resultant excitation of the generator field winding 7 containing two components dependent respectively on the displacements and velocities of the movable member and load with respect to the control member.

It will be understood that whereas in the arrangement shown in Fig. 1 of said copending application, the control in accordance with the velocities of the control member and movable member and motive equipment is derived from the rate of change of the voltage dependent on the displacements of said members and motor by appropriate arrangement of the amplifier circuits, in the arrangement shown in Fig. 1 the amplifier 8 need not include such means for modifying the effect of the displacement responsive voltages. The first stage of the amplifier 8 is generally similar to that of the amplifying circuit arrangements shown at C and D in Fig. 1 of the cognate specification of application for British Letters Patent No. 592,208 (U. S. Serial Nos. 610,353 and 610,356, now Patents Nos. 2,536,876 and 2,528,486, respectively) to which reference is made for a fuller description of the operation of said stage.

It will be understood that the tachometer generators 15, 16 and 17 may be coupled with the motor and movable member through appropriate gear trains, but these gear trains since they have to transmit only a small torque for driving said generators may be made to operate without appreciable backlash.

Figure 2:
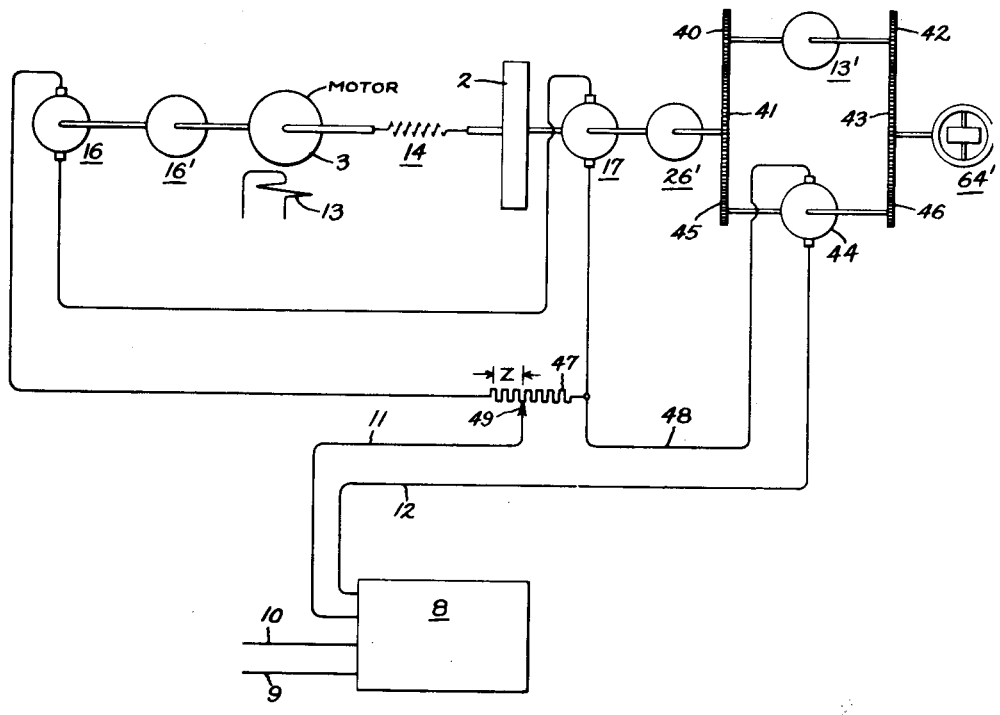

Fig. 2 shows another embodiment of the invention, representing a modification of the arrangement shown Fig. 1 for use in a system in which the control of the movable member in accordance with a control member is obtained from the motion of the movable member with respect to the control member, a quantity representing such motion being in certain control systems the only available quantity by which the required control can be obtained, such as, for example, in cases where the control member comprises a gyroscopic device for stabilising the movable member against movements of a supporting structure, for example the deck of a ship. Fig. 2 illustrates a modification according to the present invention of a gyroscopic stabilised system generally in accordance with Fig. 3 or Fig. 4 of the copending application. In Fig. 2 the motor is again indicated at 3 with its field winding at 13 whilst the movable member, such as the platform above referred to, is indicated at 2 being coupled with the motor through a transmission involving resilience or backlash or both at 14. The control member in this case comprises a gyroscope designated 64'. At 16' and 26' are shown respectively a pair of selsyn devices corresponding with the devices 16 and 26 of Fig. 3 and Fig. 4 of the earlier application aforesaid, and a device 13' having co-operating elements coupled the one through gears 40 and 41 with the load 2 and the other through gears 42 and 43 with the gimbal cage of the gyroscope 64'; this device is arranged to produce a control quantity dependent upon misalignment between the load 2 and the gyroscope 64' and may be either the selsyn device 13' of said Fig. 3 or the equivalent device 70 of said Fig. 4.

The devices 16', 26' and 13' are connected in a circuit governing the voltage applied to input conductors 9 and 10 of the amplifier 8, this circuit arrangement being that shown in said Fig. 3 or Fig. 4 and therefore not being illustrated or further described in connection with Fig. 2 of the accompanying drawings. It will be understood that the amplifier 8 of Fig. 2 is arranged as described with reference to Fig. 1 of the accompanying drawings.

In accordance with the present invention, tachometer generators 16 and 17 are coupled mechanically with the motor 3 and the load 2 as in Fig. 1, and a third tachometer generator 44 has one of its elements, for example the field system, coupled by a gear wheel 45 and the gear wheel 41 with the load 2, and its other element, for example its armature, coupled through a gear wheel 46 and the gear wheel 43 with the gyroscope 64'. This tachometer generator will therefore produce a voltage which is proportional to the relative velocity between the load 2 and the gyroscope 64'.

The armatures of the tachometer generators 16 and 17 are connected in series in the circuit shown, including the resistance 47 of a potentiometer, one end of which is connected by the conductor 48 with one brush of the tachometer generator 44. The input conductor 11 of the amplifier 8 is connected with the variable tapping point 49 of the potentiometer 47 whilst the input conductor 12 is connected with the other brush of the tachometer generator 44.

The voltage applied to the potentiometer 47 is the algebraic difference of the voltages generated by the tachometer generators 16 and 17, these voltages being regarded as of the same sense for velocities of the motor and load in directions corresponding to one another whilst the voltage derived from this potentiometer is added algebraically to that derived from the tachometer generator 44. The voltages generated by the generators 16 and 17 are equal to one another when the velocities of the motor and load are equal to one another, having regard to the gear ratio between the motor and the load, so that said voltage will be zero when the motor and load move together without backlash or resilience. The arrangement is such that the voltage derived from the potentiometer 47 will act in the same direction as that derived from the tachometer generator 44 when the motor moves with respect to the load within the backlash or resilience of the transmission in the same direction as movement of the load.

It will now be shown that the arrangement according to Fig. 2 provides identical operation to that of the arrangement of Fig. 1. In the operation of the arrangement of Fig. 1 the voltage input in the grid circuit of the amplifier is proportional to:

$$V_t - [zV_L + (1-z)V_M] \quad (1)$$

where $V_t$ = the voltage of the tachometer generator 15,
$V_M$ = the voltage of the tachometer generator 16,
$V_L$ = the voltage of the tachometer generator 17, the expression above assuming that these three voltages are all equal for a given common velocity.
$z$ = the displacement of the contact 21 of the potentiometer 19 from its extreme right-hand or zero output voltage position, so that $1-z$ equals the displacement of the contact 20 of the other potentiometer 18 from its zero voltage position.

In the arrangement according to Fig. 2 the voltage generated by the tachometer generator 44 is, using the same notation as for Fig. 1, equivalent to $V_t - V_L$.

The voltage applied by the tachometer generators 16 and 17 to the potentiometer 47 is equivalent to $V_L - V_M$ and the voltage derived from said potentiometer between the conductors 11 and 48 is equal to $(1-z)(V_L - V_M)$, $z$ being the displacement of the moving contact 49 from the extreme left-hand or maximum output voltage position. The total voltage derived from the velocities of the three generators is the algebraic sum of the last mentioned voltages and that derived from the generator 44, namely:

$$V_t - V_L + (1-z)(V_L - V_M) = V_t - [zV_L + (1-z)V_M]$$

which is identical with Expression 1 above so that identical effects on the operation of the system are obtained in both embodiments of the invention.

It will be understood that although in Fig. 2 the generator 44 has its co-operating elements coupled respectively with the gyroscope 64' and with the load 2, the arrangement may be modified by connecting the one element of said generator with the motor 3 instead of the load 2, such arrangement corresponding with that shown in Fig. 4 of said copending application for the misalignment responsive means. Where the arrangement is modified in this manner the voltage derived from the potentiometer 47 will be arranged to act in opposition to the voltage derived from the generator 44 when the motor is moving with respect to the load, within the limits of the backlash or resilience, in the same direction as the movement of the load. In general, therefore, the means co-operating with the movable member are arranged to produce a control quantity dependent on the departure of the velocity of the movable member from the required value, to which control quantity is added algebraically a control quantity dependent on velocity of the motive equipment with respect to the movable member, or alternatively means co-operating with the motive equipment are arranged to produce a control quantity dependent on departure of the velocity of the motive equipment from the required value, from which control quantity is subtracted algebraically a control quantity dependent on the velocity of the motive equipment with respect to the movable member.

The advantages of deriving the control action dependent on the motion of the movable member partly from the motion of said member and partly from the motion of the motive equipment are fully set forth in said copending application to which attention has hereinbefore been directed but may be briefly explained by considering the coupling between the motive equipment and the movable member to comprise pure resilience. In such case if the movable member were disconnected from its associated control element of the correspondence control system and the two control elements then operated to produce a control action imitating the response to a sinusoidally varying displacement of the movable member with respect to its desired position, then the motion of the motive equipment and the movable member will comprise in addition to sinusoidal components having an in-phase relation to the corresponding sinusoidal components in said control action, as would be obtained with a rigid coupling having no resilience, sinusoidal components, having an anti-phase relation to the compensating components in said control action. For frequencies of such sinusoidal components at or near the resonant frequency of the inertia of the movable member and the resilience of the coupling such anti-phase components become very large in relation to the in-phase condition and will have a predominant effect on the performance of the control system and the result is that in normal operation instability of the complete control system may result. Assuming the resilient coupling comprised a long uniform shaft there would be a node at some point along the length of the shaft where the anti-phase components on the two ends of the shaft, namely the anti-phase components in the motions of the motive equipment and the movable member would neutralise each other, only the in-phase components remaining. It will be clear that if the control action dependent on the velocity of the movable member were derived from said node the control action would be identical to that with an infinitely stiff coupling between the motive equipment and movable member. In practice it will not generally be expedient or even possible to derive such control action from a nodal point; in general the coupling will comprise a complicated gear chain in which no nodal point is available. With the arrangement according to said copending application, such nodal point is simulated by combining control actions dependent in appropriate proportions on the movements of the motive equipments and the movable member, or in other words on the movements of the two ends of the coupling.

The present invention provides similar advantages for the control in accordance with the velocity of the movable member and in similar manner to that provided by the arrangements of the earlier application enables the unstabilising effects of resilience between the motive equipment and movable member to be eliminated or reduced from the control system so that more rapid response of the movable member to movement of the control member or, in general, a greater stiffness of the system against departure of the movable member from the required position or motion thereof, to be obtained. Broadly similar effects arise in the case of backlash in the transmission so that the present invention provides means whereby the stability of the control system may be improved where backlash or resilience or both are present. In practice, the proportion of the control in accordance with velocity derived from the movable member is most readily determined by experiment, but it will be found that the optimum value of said proportion will correspond very nearly to the inertia ratio $$\frac{I_L}{I_L+I_M}$$

hereinbefore set forth. It will be seen that said ratio of control is readily adjustable in the arrangements of Fig. 1 by means of the potentiometers 18 and 19, and in Fig. 2 by means of the potentiometer 47.

It will be understood that each of the several embodiments of the invention above described may be employed in combination with any other desired control means governing the operation of the motive equipment, of electric or other form, in accordance with the output from the selsyn devices, such as, for example, with a hydraulic engine governed by the electromagnetic device described in the complete specification of application for Letters Patent Serial No. 592,208 (British application for Letters Patent No. 22,235 of 1939 aforesaid), with reference to Fig. 2 thereof.

What we claim as new and desire to secure by Letters Patent of the United States is:

1. A control system comprising, a motor, a main load member adapted to be driven by said motor, driving connections between said motor and said member, velocity responsive means directly coupled to said member, velocity responsive means directly coupled to said motor independently of said member, a control member means for governing the operation of said motor, and means serially combining the outputs of said velocity responsive means and said control member to produce a control quantity for energizing said governing means.

2. A control system comprising, a motor, a main load member adapted to be driven by said motor, driving connections between said motor and said member, a pair of tachometer generators adapted to produce a control quantity in accordance with their respective velocities, one of said generators being coupled to said member, the other of said generators being coupled to said motor independently of said member, a controlling member having a tachometer generator coupled thereto, and means for applying the algebraic sum of the outputs of said generators to govern the operation of said equipment.

3. A correspondence control system as defined in claim 2 further comprising, potentiometers connected to each of said generators to vary the relative proportion of their outputs.

4. A correspondence control system comprising, motive equipment, a main load member adapted to be driven by said equipment, driving connections between said equipment and said member, a control member adapted to produce a control quantity dependent upon its velocity, velocity responsive means including a pair of control elements, one of said elements being coupled with said load member, the other of said elements being coupled to said equipment independently of said load member, each of said velocity responsive means producing a control quantity dependent upon its velocity, and means responsive to all said control quantities for governing the operation of said equipment.

5. A control system comprising, motive equipment, a main load member adapted to be driven by said equipment, driving connections between said equipment and said load member, velocity responsive means coupled to said load member, velocity responsive means coupled to said equipment independently of said load member, a control member for producing a first control quantity depending upon its velocity of movement, means for combining the output of said velocity responsive means with said control quantity to produce a first resultant control output, means responsive to misalignment of the load member with respect to said control member, means responsive to misalignment of the motive equipment with respect to said control member, means for combining the outputs of said misalignment responsive means to produce a second resultant control output, and means responsive to the algebraic addition of said resultant control outputs for governing said motive equipment.

6. A control system in accordance with claim 5 wherein said control member further comprises, a gyroscopic position stabilizing device.

7. A control system comprising, a motor, a movable member, driving connections between said motor and said movable member, two selsyn elements each directly connected to said motor and said member respectively, a transmitter selsyn interconnected with said two selsyn elements, said elements being adapted respectively to produce a control quantity depending upon the displacement of said motor and said movable member respectively with respect to said transmitter selsyn, two generator elements each directly connected to said motor and said member respectively, a transmitter generator interconnected with said two generator elements, said elements being adapted respectively to produce a control quantity dependent upon the velocity of said motor and said movable member respectively with respect to the velocity of said transmitter generator, and control means jointly responsive to said control quantities for governing the operation of said motor.

FREDERICK HAROLD BELSEY.
DAVID TRAVIS BROADBENT.

REFERENCES CITED

The following references are of record in the file of this patent:

UNITED STATES PATENTS

| Number | Name | Date |
| --- | --- | --- |
| 2,172,410 | Riggs | Sept. 12, 1939 |
| 2,414,430 | Nisbet | Jan. 14, 1947 |
| 2,436,203 | Crever | Feb. 17, 1948 |
| 2,444,813 | Cunningham | July 6, 1948 |
| 2,457,330 | Toner | Dec. 28, 1948 |
| 2,537,083 | Peoples | Jan. 9, 1951 |

FOREIGN PATENTS

| Number | Country | Date |
| --- | --- | --- |
| 610,029 | Great Britain | Oct. 11, 1948 |